(12) United States Patent
Oh et al.

(10) Patent No.: US 12,467,111 B2
(45) Date of Patent: Nov. 11, 2025

(54) COLD-ROLLED STEEL PLATE FOR HOT FORMING, HAVING EXCELLENT CORROSION-RESISTANCE AND SPOT-WELDABILITY, HOT-FORMED MEMBER, AND METHOD FOR MANUFACTURING SAME

(71) Applicant: POSCO CO., LTD, Pohang-si (KR)

(72) Inventors: Jin-Keun Oh, Gwangyang-si (KR); Yeol-Rae Cho, Gwangyang-si (KR); A-Ra Cho, Incheon (KR); Jin-Ho Cha, Gwangyang-si (KR); Si-Myoung Heo, Gwangyang-si (KR); Jeong-Won Seo, Gwangyang-si (KR); Seong-Woo Kim, Gwangyang-si (KR)

(73) Assignee: POSCO CO., LTD, Pohang-si (KR)

(*) Notice: Subject to any disclaimer, the term of this patent is extended or adjusted under 35 U.S.C. 154(b) by 0 days.

(21) Appl. No.: 18/666,200

(22) Filed: May 16, 2024

(65) Prior Publication Data

US 2024/0301527 A1 Sep. 12, 2024

Related U.S. Application Data

(60) Continuation of application No. 18/242,140, filed on Sep. 5, 2023, now Pat. No. 12,049,679, which is a (Continued)

(30) Foreign Application Priority Data

Sep. 26, 2016 (KR) .................... 10-2016-0123273

(51) Int. Cl.
*C21D 9/46* (2006.01)
*B21B 3/02* (2006.01)
(Continued)

(52) U.S. Cl.
CPC ............ *C21D 9/46* (2013.01); *B21B 3/02* (2013.01); *B21D 22/022* (2013.01); *C21D 6/004* (2013.01);
(Continued)

(58) Field of Classification Search
None
See application file for complete search history.

(56) References Cited

U.S. PATENT DOCUMENTS 6,296,805 B1  10/2001  Laurent et al.
10,590,503 B2  3/2020  Hasegawa
(Continued)

FOREIGN PATENT DOCUMENTS

CN  102666923  9/2012
CN  105814227  7/2016
(Continued)

OTHER PUBLICATIONS

International Search Report—PCT/KR2017/010639 dated Jan. 16, 2018.
(Continued)

*Primary Examiner* — Daniel J. Schleis
(74) *Attorney, Agent, or Firm* — Morgan Lewis & Bockius LLP

(57) ABSTRACT

An aspect of the present invention relates to a cold-rolled steel plate for hot forming, which is excellent in corrosion-resistance and spot-weldability, contains, by weight %, C: 0.1-0.4%, Si: 0.5-2.0%, Mn: 0.01-4.0%, Al: 0.001-0.4%, P: 0.001-0.05%, S: 0.0001-0.02%, Cr: 0.5% to less than 3.0%, N: 0.001-0.02%, and a balance of Fe and inevitable impurities, satisfying formula (1) below, and includes an Si amorphous oxidation layer continuously or discontinuously formed at a thickness of 1 nm-100 nm on the surface thereof. Formula (1): $1.4 \leq 0.4 \cdot Cr + Si \leq 3.2$ (wherein element symbols (Continued)

denote measurements of respective element contents by weight %).

20 Claims, 5 Drawing Sheets

Related U.S. Application Data division of application No. 18/114,387, filed on Feb. 27, 2023, now Pat. No. 11,788,166, which is a division of application No. 17/885,860, filed on Aug. 11, 2022, now Pat. No. 11,624,100, which is a continuation of application No. 16/336,645, filed as application No. PCT/KR2017/010639 on Sep. 26, 2017, now Pat. No. 11,441,205.

(51) Int. Cl.
| | |
|---|---|
| *B21D 22/02* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/50* | (2006.01) |
| *C22C 38/54* | (2006.01) |

(52) U.S. Cl.
CPC ............. *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/50* (2013.01); *C22C 38/54* (2013.01); *C21D 2211/003* (2013.01); *C21D 2211/005* (2013.01)

(56) References Cited

U.S. PATENT DOCUMENTS

| | | | |
|---|---|---|---|
| 11,441,205 | B2 | 9/2022 | Oh |
| 11,624,100 | B2 | 4/2023 | Oh |
| 11,788,166 | B2 | 10/2023 | Oh |
| 2008/0053580 | A1 | 3/2008 | Drillet et al. |
| 2012/0325376 | A1 | 12/2012 | Makimizu et al. |
| 2013/0295402 | A1 | 11/2013 | Oh et al. |
| 2014/0234658 | A1 | 8/2014 | Nozaki et al. |
| 2015/0020992 | A1 | 1/2015 | Shottler et al. |
| 2016/0319385 | A1 | 11/2016 | Hasegawa et al. |
| 2017/0088914 | A1* | 3/2017 | Ikeda ............... C22C 38/28 |
| 2017/0369974 | A1 | 12/2017 | Kim et al. |

FOREIGN PATENT DOCUMENTS

| | | | |
|---|---|---|---|
| EP | 2684972 | 1/2014 | |
| EP | 3020842 | 5/2016 | |
| EP | 3054025 | 8/2016 | |
| JP | 61110757 | 5/1986 | |
| JP | 2005133180 | 5/2005 | |
| JP | 2007113108 | 5/2007 | |
| JP | 2014508854 | 4/2014 | |
| KR | 20090124263 | 12/2009 | |
| KR | 20110065949 | 6/2011 | |
| KR | 20130076959 | 7/2013 | |
| KR | 20140002272 | 1/2014 | |
| KR | 20140138801 | 12/2014 | |
| KR | 20150053625 | 5/2015 | |
| KR | 20160077582 | 7/2016 | |
| KR | 20160078851 | 7/2016 | |
| WO | 2009145563 | 12/2009 | |
| WO | 2013047836 | 4/2013 | |
| WO | 2014166630 | 10/2014 | |
| WO | 2015093043 | 6/2015 | |
| WO | WO-2015146692 A1 * | 10/2015 | ............ B32B 15/01 |
| WO | 2016093598 | 6/2016 | |

OTHER PUBLICATIONS

European Search Report—European Application No. 17853506.8, issued on Aug. 2, 2019.
Chinese Office Action—Chinese Application No. 201780059276.9 issued on Apr. 27, 2020.
Japanese Office Action—Japanese Application No. 2019-515875 issued on Mar. 24, 2020.
Non-Final Office Action dated Feb. 3, 2022 issued in U.S. Appl. No. 16/336,645.
U.S. Notice of Allowance dated May 6, 2022 issued in U.S. Appl. No. 16/336,645.
U.S. Notice of Allowance dated Nov. 29, 2022 issued in U.S. Appl. No. 17/885,860.
U.S. Notice of Allowance dated Jul. 6, 2023 issued in U.S. Appl. No. 18/114,387.
U.S. Notice of Allowance dated Apr. 8, 2024 issued in U.S. Appl. No. 18/242,140.

\* cited by examiner

COLD-ROLLED STEEL PLATE FOR HOT FORMING, HAVING EXCELLENT CORROSION-RESISTANCE AND SPOT-WELDABILITY, HOT-FORMED MEMBER, AND METHOD FOR MANUFACTURING SAME

CROSS-REFERENCE OF RELATED APPLICATIONS

This application is a continuation of U.S. patent application Ser. No. 18/242,140, filed on Sep. 5, 2023, which is a divisional of U.S. patent application Ser. No. 18/114,387, filed on Feb. 27, 2023, now U.S. Pat. No. 11,788,166, filed on Oct. 17, 2023, which is a divisional of U.S. patent application Ser. No. 17/885,860, filed on Aug. 11, 2022, now U.S. Pat. No. 11,624,100, issued on Apr. 11, 2023, which is a continuation of U.S. patent application Ser. No. 16/336,645, filed on Mar. 26, 2019, now U.S. Pat. No. 11,441,205, issued on Sep. 13, 2022, which is the U.S. National Phase under 35 U.S.C. § 371 of International Patent Application No. PCT/KR2017/010639, filed on Sep. 26, 2017, which in turn claims the benefit of Korean Application No. 10-2016-0123273, filed on Sep. 26, 2016, the entire disclosures of which applications are incorporated by reference herein.

TECHNICAL FIELD

The present disclosure relates to a cold-rolled steel plate for hot forming, having excellent corrosion-resistance and spot-weldability, a hot-formed member, and a method for manufacturing the same.

BACKGROUND ART

Members manufactured through a hot-forming process have been increasingly applied to use as structural members of vehicles to improve fuel efficiency by reducing a weight of a vehicle and to improve crashworthiness by achieving ultra-high strength, and a large amount of research has accordingly been conducted.

A representative technique is the invention disclosed in reference 1.

Reference 1 discloses that, by heating an Al—Si plated steel plate at 850° C. or more and forming a structure of a member with martensite through a hot-forming process and rapid cooling using a press, ultra-high strength with tensile strength of higher than 1600 MPa may be secured. Also, due to an alloying layer and a diffusion layer formed by diffusing Fe from a base material to a plating layer during heat treatment, corrosion-resistance and spot-weldability may be secured without a shot blasting process.

However, as an Al—Si plated layer needs to be formed, an additional plating process may be necessary, which may degrade economical efficiency and productivity.

In the case of a non-plated material, it may be impossible to secure spot-weldability due to an oxide layer created during heat treatment. Accordingly, a shot blasting process may be required to remove the oxide layer, and it may be difficult to secure corrosion-resistance.

Thus, it has been required to develop a cold-rolled steel plate for hot forming, which may secure excellent corrosion-resistance and spot-weldability without performing a plating process and a shot blasting process, a hot-formed member, and a method for manufacturing the same.

PRIOR ART (Reference 1) U.S. Registered U.S. Pat. No. 6,296,805

DISCLOSURE

Technical Problem

An aspect of the present disclosure is to provide a cold-rolled steel plate for hot forming, having excellent corrosion-resistance and spot-weldability without a plating process and a shot blasting process, a hot-formed member, and a method for manufacturing the same, which may be preferably applied to structural members, reinforcements, and the like, of vehicles in which crashworthiness is required.

Meanwhile, the purposes of the present disclosure are not limited to the features described above. The purposes of the present disclosure may be understood on the basis of the descriptions in the specification, and it may not be difficult for a person having skilled in the art in the field in which the present disclosure is included to understand additional purposes of the present disclosure.

Technical Solution

An aspect of the present disclosure relates to a cold-rolled steel plate for hot forming, which is excellent in corrosion-resistance and spot-weldability, contains, by weight %, C: 0.1-0.4%, Si: 0.5-2.0%, Mn: 0.01-4.0%, Al: 0.001-0.4%, P: 0.001-0.05%, S: 0.0001-0.02%, Cr: 0.5% or higher and less than 3.0%, N: 0.001-0.02%, and a balance of Fe and inevitable impurities, satisfying formula (1) below, and includes an Si amorphous oxidation layer continuously or discontinuously formed to a thickness of 1 nm-100 nm on the surface thereof. Formula (1): $1.4 \leq 0.4*Cr+Si \leq 3.2$ (wherein element symbols denote measurements of respective element contents by weight %).

Another aspect of the present disclosure relates to a method of manufacturing a cold-rolled steel plate for hot-forming, having excellent corrosion-resistance and spot-weldability, the method including, heating a slab to 1000~1300° C., the slab including C: 0.1 to 0.4%, Si: 0.5 to 2.0%, Mn: 0.01 to 4.0%, Al: 0.001 to 0.4%, P: 0.001 to 0.05%, S: 0.0001 to 0.02%, Cr: 0.5% or higher and less than 3.0%, N: 0.001 to 0.02%, and a balance of Fe and inevitable impurities by weight % and satisfying equation (1) below: equation (1): $1.4 \leq 0.4*Cr+Si \leq 3.2$, where each element symbol is a value of a content of each element measured by weight %; obtaining a hot-rolled steel plate by hot-rolling the heated slab at finishing rolling temperature of Ar3 to 1000° C.; coiling the hot-rolled steel plate within a temperature range of higher than Ms to 750° C. or less; obtaining a cold-rolled steel plate by cold-rolling the coiled hot-rolled steel plate; and continuously annealing the cold-rolled steel plate to satisfy equation (2) and equation (3) below: equation (2): $1 \leq \exp[0.07*DP(I)+(0.6*Cr+3*Si)] \leq 100$, and equation (3): $50*\exp[0.05*DP(I)-(1.2*Cr+6*Si)] \leq 2.5$, where each element symbol is a value of a content of each element measured by weight %, and DP(I) is a dew point temperature (° C.) when continuous annealing is performed.

Another aspect of the present disclosure relates to a hot-formed member manufactured using a cold-rolled steel plate, and a method of manufacturing the same.

The solutions described above do not necessarily list all the features of the present disclosure. Various features of the present disclosure, and advantages and effects thereof will further be understood with reference to exemplary embodiments described below.

Advantageous Effects

According to the present disclosure, a cold-rolled steel plate for hot forming, having excellent corrosion-resistance and spot-weldability without a shot blasting process for removing oxide formed on a surface when a plating process is performed and a hot-formed member is manufactured, a hot-formed member, and a method of manufacturing the same may be provided. Also, 1000 MPa or higher tensile strength may be secured.

BEST MODE FOR INVENTION

Figure 1:
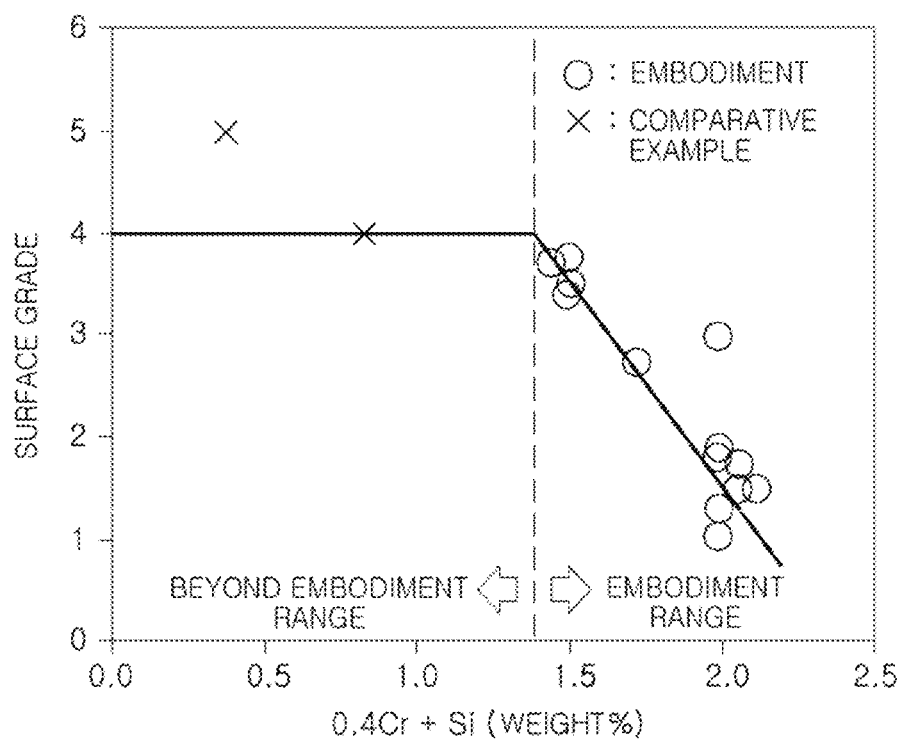
FIG. 1 is a graph illustrating changes in surface grade in accordance with a value of equation (1)

Hereinafter, embodiments of the present disclosure will be described with reference to the accompanied drawings. The present disclosure, however, may be modified to various other embodiments, and the scope of the present disclosure may not be limited to exemplary embodiments described below. These embodiments are provided to help those skilled in the art to understand the present disclosure.

In the case of a non-plated cold-rolled steel plate for hot forming, spot-weldability may not be secured due to an oxide layer formed during heat treatment, and a shot blasting process for removing the oxide layer may be required. Also, it may be difficult to secure corrosion-resistance. The purpose of the present disclosure is to address the issues above.

According to the present disclosure, by accurately controlling an alloy composition and manufacturing conditions, particularly by controlling the correlation among a content of Cr, a content of Si, and a dew point temperature, an Si-based amorphous oxide layer may be formed with a desired thickness such that, without a plating process and a shot blasting process, excellent corrosion-resistance and spot-weldability may be secured.

In the descriptions below, a cold-rolled steel plate for hot forming, having excellent corrosion-resistance and spot-weldability, will be described in accordance with an exemplary embodiment.

A cold-rolled steel plate for hot forming, having excellent corrosion-resistance and spot-weldability may include C: 0.1 to 0.4%, Si: 0.5 to 2.0%, Mn: 0.01 to 4.0%, Al: 0.001 to 0.4%, P: 0.001 to 0.05%, S: 0.0001 to 0.02%, Cr: 0.5% or higher and less than 3.0%, N: 0.001 to 0.02%, and a balance of Fe and inevitable impurities by weight %, and may satisfy equation (1) below. An Si-based amorphous oxide layer having a thickness of 1 nm to 100 nm may be continuously or discontinuously formed on a surface of the cold-rolled steel plate.

$$1.4 \leq 0.4*Cr + Si \leq 32 \qquad \text{Equation (1)}$$

(where each element symbol is a value of a content of each element measured by weight %)

In the description below, an alloy composition of a cold-rolled steel plate for hot forming, having excellent corrosion-resistance and spot-weldability, will be described in greater detail in accordance with an exemplary embodiment. A unit of a content of each element may be weight %.

C: 0.1 to 0.4%

An appropriate content of C may be added as an essential element to improve strength of a heat treatment member.

When a content of C is less than 0.1%, it may be difficult to secure sufficient strength. Thus, a preferable content of C may be 0.1% or higher. When a content of C exceeds 0.4%, strength of a hot-rolled material may be excessively high when the hot-rolled material is cold-rolled, such that cold-rolling properties may be significantly deteriorated, and spot-weldability may also significantly degrade. Thus, a preferable content of C may be 0.4% or less. A more preferable upper limit may be 0.35%, and an even more preferable upper limit of may be 0.3%.

Si: 0.5 to 2.0%

Si may be important in that Si is concentrated on a surface of the cold-rolled steel plate and forms an Si-based amorphous oxide layer when the cold-rolled steel plate is annealed on a continuous annealing line. Si may also prevent the formation of an Fe, Mn, and Cr oxide layer in a hot-forming process such that Si may secure spot-weldability of a member.

When a content of Si is less than 0.5%, the above-described effect may not be sufficient. Thus, a lower limit of a content of Si may be 0.5% preferably. A more preferable lower limit may be 0.8%. When a content of Si exceeds 2.0%, a thickness of an Si-based amorphous oxide layer may excessively increase such that spot-weldability may degrade.

Cr: 0.5% or Higher and Less than 3.0%

Cr may improve hardenability of a steel plate, and may help an Si-based amorphous oxide layer to be stably formed on a surface layer by appropriate reacting with Si.

When a content of Cr is less than 0.5%, the above-described effect may not be sufficient. When a content of Cr is 3.0% or higher, the effect may be saturated, and manufacturing costs may increase.

Cr and Si may need to satisfy the respective element contents described above, and may also need to satisfy equation (1): 1.4≤0.4*Cr+Si≤3.2. As illustrated in FIG. 1, when a value of equation (1) is less than 1.4, it may be difficult to secure a uniform surface grade on a surface after a hot-forming process, and when a value of equation (1) exceeds 3.2, the effect may be saturated, and manufacturing costs may increase, and spot-weldability may degrade. A more preferable upper limit of a value of equation (1) may be 3.0, and an even more preferable upper limit may be 2.5.

Mn: 0.01 to 4.0%

Mn may be added to secure a solid solution strengthening effect and to reduce a critical cooling speed for securing martensite in relation to a hot-formed member.

When a content of Mn is less than 0.01%, the above-described effect may not be sufficient. When a content of Mn exceeds 4.0%, strength of a steel plate before a hot-forming process may excessively increase such that it may be difficult to perform a blanking process. Further, due to excessive addition of ferro-alloy, costs of raw materials may rise, and spot-weldability may degrade. A more preferable upper limit may be 3.0%, and an even more preferable upper limit may be 2.0%.

Al: 0.001 to 0.4%

Al may perform deoxidization in steelmaking along with Si, and may increase cleanness of steel accordingly.

When a content of Al is less than 0.001%, the above-described effect may not be sufficient, and when a content of Al exceeds 0.4%, an Ac3 temperature may excessively rise such that a heating temperature may need to be increased. A more preferable upper limit may be 0.2%, and an even more preferable upper limit may be 0.1%.

P: 0.001 to 0.05%

P may be impurities. To control a content of P to be less than 0.001%, relatively high manufacturing costs may be required. When a content of P exceeds 0.05%, weldability of a hot-formed member may significantly degrade. A more preferable upper limit may be 0.03%. S: 0.0001 to 0.02%

S may be impurities. To control a content of S to be less than 0.0001%, relatively high manufacturing costs may be required. When a content of S exceeds 0.02%, ductility of a member, impact toughness, and weldability may degrade. A more preferable upper limit may be 0.01%.

N: 0.001 to 0.02%

N may be impurities. To control a content of N to be less than 0.001%, relatively high manufacturing costs may be required. When a content of N exceeds 0.02%, a slab may become vulnerable to cracks when the slab is continuously casted, and impact toughness may be deteriorated. A more preferable upper limit may be 0.01%.

A remaining element of the exemplary embodiment may be iron (Fe). In a general manufacturing process, as unintended impurities from raw materials or surrounding environment may inevitably be mixed, impurities may not be excluded. A person skilled in the art, familiar with a general manufacturing process, may be aware of the impurities, and thus, the impurities will not be described in greater detail.

In addition to the above-described elements, one or more elements selected from between a) and b) may further be included.

a) One or More Elements Selected from Among Ti, Nb, Zr, and V: 0.001 to 0.4%

Ti, Nb, Zr, and V may form fine precipitations, which may be effective to improve strength of a heat treatment member, and may also be effective to stabilize residual austenite and to improve impact toughness due to grain refinement. When a content (a sum of contents of Ti, Nb, Zr, and V when two or more elements are added) of Ti, Nb, Zr, and V is 0.001% or lower, the above-described effect may not be sufficient. When a content of Ti, Nb, Zr, and V exceeds 0.4%, the effect may be saturated, and due to excessive addition of ferro-alloy, costs of raw materials may also increase.

b) B: 0.0001 to 0.01%

With even a small content of B, B may improve hardenability. Also, B may be segregated into grain boundaries of prior austenite such that B may prevent brittleness of the hot-formed member by grain boundary segregation of P and/or S.

When a content B is less than 0.0001%, the above-described effect may not be sufficient. When a content of B exceeds 0.01%, the effect may be saturated, and hot brittleness may occur when a hot-rolling process is performed. A more preferable upper limit may be 0.005%.

Also, one or more elements selected from among c) to e) may further be included.

c) One or More Elements Selected from Between Mo and W: 0.001 to 1.0%

Mo and W may be added to improve hardenability, and to improve strength through a precipitation reinforcement effect and to obtain grain refinement. When a content (a sum of contents of Mo and W when both of Mo and W are added) of Mo and W is less than 0.001%, the above-described effect may not be sufficient. When a content of Mo and W exceeds 1.0%, the effect may be saturated, and costs may rise.

d) a Sum of Contents of Cu and Ni: 0.005 to 2.0%

Cu may be added as an element which improves strength by forming fine precipitations. When Cu is added alone, it may cause hot brittleness, and thus, Ni may be added if necessary.

When a sum of contents of Cu and Ni is less than 0.005%, the above-described effect may not be sufficient. When a sum of the contents exceeds 2.0%, costs may rise excessively.

e) One or More Elements Selected from Between Sb and Sn: 0.001 to 1.0%

Sb and Sn may be effective to prevent the formation of oxide which may be formed on grain boundaries on a surface layer of a hot-rolled material of steel to which Si is added, such that Sb and Sn may prevent dent defects caused by separation of grain boundaries on a surface layer when a cold rolled material is annealed. To obtain such an effect, a preferable content of Sb and Sn may be 0.001% or higher.

When a content (a sum of contents of Sb and Sn when both of Sb and Sn are added) of Sb and Sn exceeds 1.0%, costs may rise excessively. Further, Sb and Sn may be solidified to grain boundaries of a slab, which may cause cracks on coil edges when a hot-rolling process is performed.

The cold-rolled steel plate for hot-forming, having excellent corrosion-resistance and spot-weldability, in the exemplary embodiment may satisfy the above-described alloy composition, and an Si-based amorphous oxide layer having a thickness of 1 to 100 nm may be formed continuously or discontinuously on a surface of the steel plate.

The Si-based amorphous oxide layer may be oxide created when Si is combined with oxygen, and may refer to a layer formed of oxide having an amorphous structure, which may be created when Si added to steel is concentrated onto a surface layer and is combined with oxygen in a furnace during an annealing process. The Si-based amorphous oxide layer may be strong against corrosion, and may be effective to improve corrosion-resistance and to prevent the formation of an Fe, Mn, and Cr oxide layer.

When a thickness of the Si-based amorphous oxide layer is less than 1 nm, it may be difficult to form a sufficient Si-based amorphous oxide layer after a hot-forming process. Accordingly, the effect of improvement in corrosion-resistance may be insignificant, and the formation of an Fe, Mn, and Cr oxide layer may be facilitated such that it may be difficult to secure sufficient corrosion-resistance and good spot-weldability.

When a thickness of the Si-based amorphous oxide layer exceeds 100 nm, sufficient corrosion-resistance may be secured after a hot-forming process, but it may be difficult to secure spot-weldability. Thus, a preferable upper limit of a thickness of the Si-based amorphous oxide layer may be 100 nm, a more preferable upper limit may be 70 nm, and an even more preferable upper limit may be 50 nm.

In this case, the Fe, Mn, and Cr oxide layer may be formed to a thickness of 2.5 µm or less on the Si-based amorphous oxide layer.

When a thickness of the Fe, Mn, and Cr oxide layer exceeds 2.5 µm, a shot blasting process may be required to remove the Fe, Mn, and Cr oxide layer so as to secure spot-weldability, and it may be difficult to secure corrosion-resistance.

A microstructure of the cold-rolled steel plate in the exemplary embodiment may include ferrite and cementite. In particular, it may not be necessary to limit an area fraction of the microstructure. For example, an area fraction of ferrite and cementite may be 50 area % or more.

When a blank is made to manufacture a hot-formed member, if strength of the cold-rolled steel plate is too high, mold abrasion may easily occur. However, without considering the mold abrasion, bainite, martensite, and the like, may be included.

In the description below, a method of manufacturing a cold-rolled steel plate for hot-forming will be described in detail in accordance with an exemplary embodiment.

A method of manufacturing a cold-rolled steel plate for hot-forming according to an exemplary embodiment may include heating a slab satisfying the above-described alloy composition to 1000 to 1300° C.; obtaining a hot-rolled steel plate by hot-rolling the heated slab at finishing rolling temperature of Ar3 to 1000° C.; coiling the hot-rolled steel plate at a temperature range of higher than Ms to 750° C. or less; obtaining a cold-rolled steel plate by cold-rolling the coiled hot-rolled steel plate; and continuously annealing the cold-rolled steel plate to satisfy equation (2) and equation (3) below:

$$1.4 \le 0.4*Cr + Si \le 32 \quad \text{Equation (1)}$$

$$1 \le \exp[0.07*DP(I) + (0.6*Cr + 3*Si)] \le 100 \quad \text{Equation (2)}$$

$$50*\exp[0.05*DP(I) - (1.2*Cr + 6*Si)] \le 2.5 \quad \text{Equation (3)}$$

(in equation (1) to equation (3), each element symbol is a value of a content of each element measured by weight %, and in equation (2) and equation (3), DP(I) is a dew point temperature when the continuous annealing is performed).

Heating Slab

A slab satisfying the above-described alloy composition may be heated to 1000 to 1300° C.

When the heating temperature is less than 1000° C., it may be difficult to homogenize a structure of the slab. When the heating temperature exceeds 1300° C., oxide may be excessively formed, and manufacturing costs may rise.

Hot-Rolling

A hot-rolled steel plate may be obtained by hot-rolling the heated slab at finishing rolling temperature of Ar3 to 1000° C.

When the finishing rolling temperature is less than an Ar3 temperature, the rolling may be performed at two phase regions such that duplex grain structures may be created on a surface layer, and it may be difficult to control a shape of the hot-rolled steel plate. When the finishing rolling temperature exceeds 1000° C., grains of the hot-rolled steel plate may easily be coarsened.

Coiling

The hot-rolled steel plate may be coiled at a temperature range of higher than Ms to 750° C. or less.

When the coiling temperature is Ms (a martensite transformation initiating temperature) or lower, strength of the hot-rolled steel plate may be excessively high such that cold-rolling properties may degrade. When the coiling temperature exceeds 750° C., a thickness of an oxide layer may increase, and grain boundary oxidation may occur on a surface layer such that pickling properties may degrade, and separation of grain boundaries on a surface layer may occur during an annealing process in a continuous annealing furnace.

Cold-Rolling

A cold-rolled steel plate may be obtained by cold-rolling the coiled hot-rolled steel plate. This process may be performed to more accurately control a thickness of the steel plate, and a pickling process may be performed before the cold-rolling.

It may not be necessary to limit a reduction ratio of the cold-rolling to a particular value, but to secure a certain target thickness, a reduction ratio may be 30 to 80%.

Continuous Annealing

The cold-rolled steel plate may be continuously annealed to satisfy equation (2) and equation (3) below. In equation (2) and equation (3), each element symbol is a value of a content of each element measured by weight %, and DP(I) is a dew point temperature when the continuous annealing is performed.

$$1 \le \exp[0.07*DP(I) + (0.6*Cr + 3*Si)] \le 100 \quad \text{Equation (2)}$$

Figure 2:
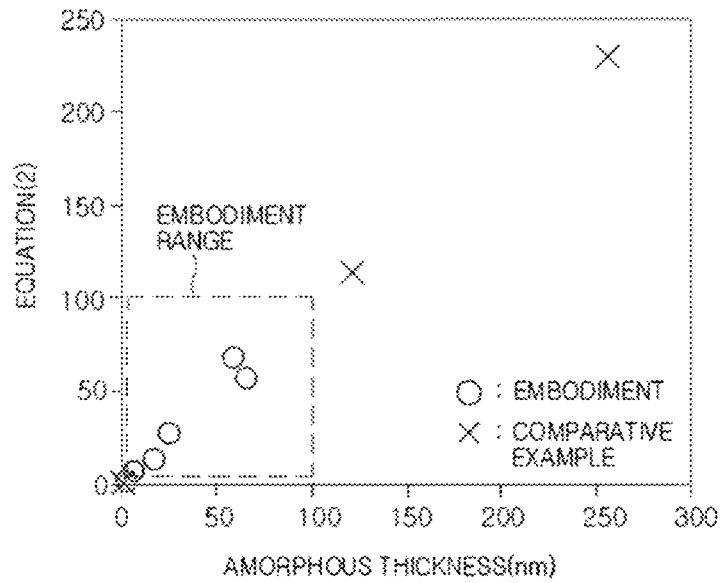
FIG. 2(a) is a graph illustrating changes in thickness of an Si-based amorphous oxide layer of a cold-rolled steel plate in accordance with a value of equation (2)
FIG. 2(b) is a graph illustrating changes in thickness of an Fe, Mn, and Cr oxide layer of a cold-rolled steel plate in accordance with a value of equation (3)
Figure 2:
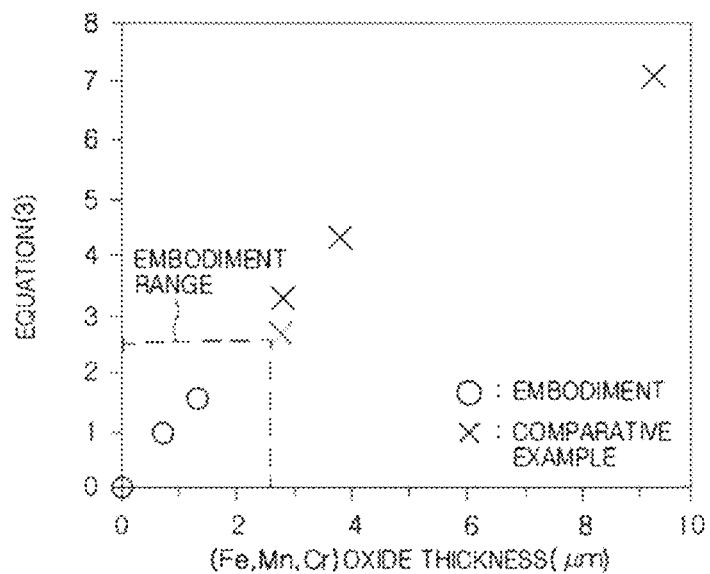

Equation (2) may be to control a thickness of the Si-based amorphous oxide layer of the cold-rolled steel plate in consideration of correlation among a content of Si, a content of Cr, and a dew point (DP(I)) of when the continuous annealing is performed. As indicated in FIG. 2(a), graphs illustrating changes in thickness of the Si-based amorphous oxide layer of the cold-rolled steel plate in accordance with a value of equation (2), a thickness of the Si-based amorphous oxide layer may be controlled in accordance with a value of equation (2).

When a value of equation (2) is less than 1, a sufficient thickness of the Si-based amorphous oxide layer may not be secured on a surface such that it may be difficult to prevent the formation of an Fe, Mn, and Cr oxide layer, and without an additional plating process or a shot blasting process, excellent spot-weldability and corrosion-resistance may not be secured.

When a value of equation (2) exceeds 100, a thickness of the Si-based amorphous oxide layer may excessively increase such that it may be difficult to secure sufficient spot-weldability.

$$50*\exp[0.05*DP(I) - (1.2*Cr + 6*Si)] \le 2.5 \quad \text{Equation (3)}$$

Equation (3) is to control a thickness of the Fe, Mn, and Cr oxide layer of the cold-rolled steel plate in consideration of correlation among a content of Si, a content of Cr, and a dew point (DP(I)) of when the continuous annealing is performed. As indicated in FIG. 2(b), graphs illustrating changes in thickness of the Si-based amorphous oxide layer of the cold-rolled steel plate in accordance with a value of equation (3), a thickness of the Fe, Mn, and Cr oxide layer may be controlled in accordance with a value of equation (3).

When a value of equation (3) exceeds 2.5, a thickness of the Fe, Mn, and Cr oxide layer may increase such that an exterior of a surface of the steel plate may be deteriorated, and spot-weldability may also be deteriorated after a hot-forming process.

The continuous annealing may be performed within a temperature range of 700 to 900° C. When an annealing temperature is less than 700° C., it may be difficult to restore and recrystallize a rolled structure created by the cold-rolling. When an annealing temperature exceeds 900° C., an annealing facility may be deteriorated, and excessive oxide may be formed on a surface layer of the steel plate, which may significantly degrade spot-weldability after the hot-forming.

An annealing time may be 1 to 1000 seconds. In the exemplary embodiment, as an annealing process is continuously performed, it may be difficult to accurately control the annealing time, and thus, a dew point may be controlled. When the annealing time is less than 1 second, it may be difficult to obtain an annealing effect, and when the annealing time exceeds 1000 seconds, productivity may degrade.

In the description below, a method of manufacturing a hot-formed member having excellent corrosion-resistance and spot-weldability will be described in detail in accordance with an exemplary embodiment.

A method of manufacturing a hot-formed member having excellent corrosion-resistance and spot-weldability in the exemplary embodiment may include performing heat treatment in which a cold-rolled steel plate manufactured by the method of manufacturing the cold-rolled steel plate described in the aforementioned exemplary embodiment is heated to a temperature range of Ac3 to Ac3+150° C. at a temperature rising speed of 1 to 1000° C./sec while satisfying equation (4) and equation (5) below, and the heated cold-rolled steel plate is maintained for 1 to 1000 seconds; and hot-forming the heated cold-rolled steel plate and cooling the steel plate at a cooling speed of 10 to 1000° C./sec.

Heat Treatment

In the heat treatment, the cold-rolled steel plate manufactured by the method of manufacturing the cold-rolled steel plate in the aforementioned exemplary embodiment may be heated to a temperature range of Ac3 to Ac3+150° C. at a temperature rising speed of 1 to 1000° C./sec while satisfying equation (4) and equation (5) below, and the heated cold-rolled steel plate may be maintained for 1 to 1000 seconds.

When the temperature rising speed is less than 1° C./sec, it may be difficult to secure sufficient productivity, and oxidization may be accelerated excessively on a surface of the member such that it may be difficult to secure sufficient spot-weldability. When the temperature rising speed exceeds 1000C/sec, an expensive facility may be required.

When the heating temperature is less than Ac3, or the maintaining time is less than 1 second, ferrite which has not been completely transformed to austenite may remain, and ferrite may be formed again while a blank is transferred to a mold from a heating furnace such that it may be difficult to secure a certain strength. When the heating temperature exceeds Ac3+150° C., or the maintaining time exceeds 1000 seconds, oxide may be excessively formed on a surface of the member such that it may be difficult to secure spot-weldability.

In equation (4) and equation (5), each element symbol is a value of a content of each element measured by weight %, and DP(II) is a dew point temperature of the heat treatment.

$$2 \le \text{equation (2)} * \exp[0.07 * DP(II) + (0.6 * Cr + 1.5 * Si)] \le 2000 \quad \text{Equation (4)}$$

Figure 3:
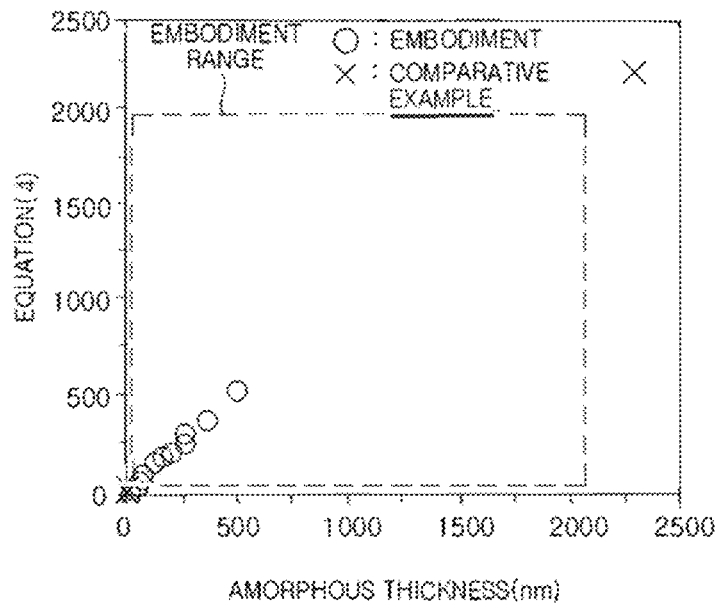
FIG. 3(a) is a graph illustrating changes in thickness of an Si-based amorphous oxide layer of a hot-formed member in accordance with a value of equation (4)
FIG. 3(b) is a graph illustrating changes in thickness of an Fe, Mn, and Cr oxide layer of a hot-formed member in accordance with a value of equation (5)
Figure 3:
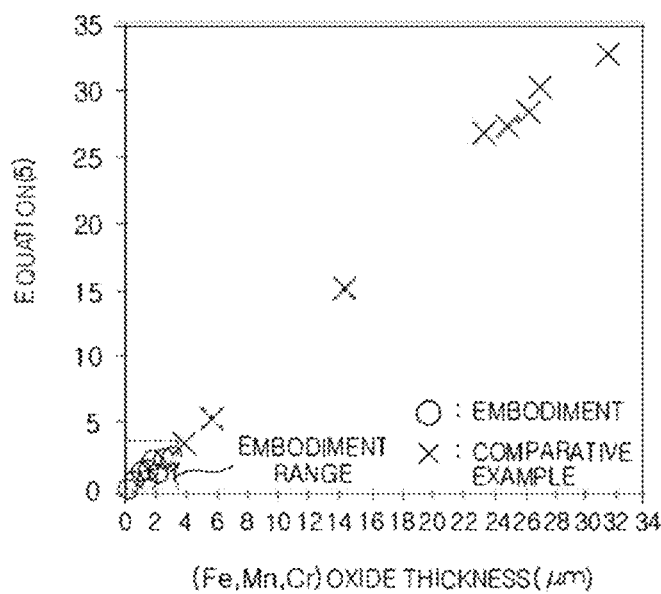

Equation (4) may be to control a thickness of the Si-based amorphous oxide layer of the hot-formed member in consideration of correlation among a content of Si, a content of Cr, a dew point (DP(I)) of when the continuous annealing is performed, and a dew point (DP(II)) of when the heat treatment is performed. As indicated in FIG. 3(a), graphs illustrating changes in thickness of the Si-based amorphous oxide layer of the hot-formed member in accordance with a value of equation (4), a thickness of the Si-based amorphous oxide layer of the hot-formed member may be controlled in accordance with a value of equation (4).

When a value of equation (4) is less than 2, it may be difficult to secure a sufficient thickness of the Si-based amorphous oxide layer on a surface such that sufficient corrosion-resistance may not be secured. Thus, a preferable lower limit of a value of equation (4) may be 2, a more preferable value may be 3, and an even more preferable value may be 4.

When a value of equation (4) exceeds 2000, a thickness of the Si-based amorphous oxide layer may excessively increase such that it may be difficult to sufficient spot-weldability.

$$\text{equation (3)} + 50 * \exp[0.05 * DP(II) - (0.4 * Cr + 2 * Si)] \le 3 \quad \text{Equation (5)}$$

Equation (5) may be to control a thickness of the Fe, Mn, and Cr oxide layer of the hot-formed member in consideration of correlation among a content of Si, a content of Cr, and a dew point (DP(I)) of when the continuous annealing is performed, and a dew point (DP(II)) of when the heat treatment is performed. As indicated in FIG. 3(b), graphs illustrating changes in thickness of the Fe, Mn, and Cr oxide layer of the hot-formed member in accordance with a value of equation (5), a thickness of the Fe, Mn, and Cr oxide layer of the hot-formed member may be controlled in accordance with a value of equation (5).

When a value of equation (5) exceeds 3, a thickness of the Fe, Mn, and Cr oxide layer may increase such that an exterior of a surface of the steel plate may be deteriorated, and spot-weldability may degrade.

Hot-Forming and Cooling

After hot-forming the heated cold-rolled steel plate, the steel plate may be cooled at a cooling speed of 10 to 1000° C./sec.

When the cooling speed is less than 10° C./sec, unwanted ferrite may be formed such that it may be difficult to secure 1000 MPa or higher tensile strength, whereas, to control the cooling speed to exceed 1000° C./sec, an extensive and special cooling facility may be required.

A cooling stop temperature of the cooling may be Mf (a martensite transformation terminating temperature) or less.

When the cooling stops at a temperature higher than Mf, and the cooling is performed again to cool down the steel plate to room temperature, it may be difficult to secure shape fixability of the hot-formed member.

However, to secure improved elongation and impact toughness of the hot-formed member, the cooling may stop between Mf (a martensite transformation terminating temperature) and Ms (a martensite transformation initiating temperature), and the steel plate may be heated again at temperature of Ac1 or lower such that martensite may be tempered and residual austenite may be stabilized.

In the description below, a hot-formed member having excellent corrosion-resistance and spot-weldability will be described in detail in accordance with an exemplary embodiment.

The hot-formed member having excellent corrosion-resistance and spot-weldability in the exemplary embodiment may satisfy the above-described alloy composition, and an Si-based amorphous oxide layer having a thickness of 2 nm to 2000 nm may be continuously or discontinuously formed on a surface of the hot-formed member.

When a thickness of the Si-based amorphous oxide layer is less than 2 nm, it may be difficult to secure sufficient corrosion-resistance. Thus, a lower limit of the thickness may be 2 nm preferably, a more preferable lower limit may be 3 nm, and an even more preferable lower limit may be 3.5 nm.

When the thickness exceeds 2000 nm, sufficient corrosion-resistance may be secured, but it may be difficult to secure sufficient spot-weldability. Thus, an upper limit of the thickness may be 2000 nm preferably, a more preferable upper limit may be 1000 nm, and an even more preferable upper limit may be 500 nm.

An Fe, Mn, and Cr oxide layer may be formed to a thickness of 3 µm or less on the Si-based amorphous oxide layer.

When a thickness of the Fe, Mn, and Cr oxide layer exceeds 3 µm, an exterior of a surface of the steel plate may be deteriorated, and a shot blasting process for removing the Fe, Mn, and Cr oxide layer may be required to secure spot-weldability, and it may be difficult to secure corrosion-resistance.

To secure high strength, the hot-formed member may include martensite or bainite as a main phase. The main phase refers to a phase having the largest area fraction among numerous phases forming a microstructure. The area fraction may not be limited to a particular value. For example, the area fraction may be 50 area % or higher.

The hot-formed member may have 1000 MPa or higher tensile strength. By securing 1000 MPa or higher tensile strength, the hot-formed member may be applied to structural members or reinforcements of vehicles in which crashworthiness is required.

The hot-formed member may have a spot welding current range of 1.0 kA or higher. When the spot welding current range is 1.0 kA, spot-weldability may be deteriorated, and generally, most of customer companies require a spot welding current range of 1.0 kA or higher.

MODE FOR INVENTION

In the description below, embodiments of the present disclosure will be described in greater detail. It should be noted that the exemplary embodiments are provided to describe the present disclosure in greater detail, and to not limit the scope of rights of the present disclosure. The scope of rights of the present disclosure may be determined on the basis of the subject matters recited in the claims and the matters reasonably inferred from the subject matters.

Embodiment 1

In the embodiment, a slab having element composition indicated in table 1 and having a thickness of 40 mm was melted in vacuum, heated at 1200° C. for 1 hour in a heating furnace, hot-rolled at a finishing rolling temperature of 900° C., and a hot-rolled steel plate having a final thickness of 3 mm was manufactured. The hot-rolled steel plate was coiled at 600° C. Thereafter, the hot-rolled steel plate was pickled, and the hot-rolled steel plate was cold-rolled at a cold reduction ratio of 50%.

Using the cold-rolled steel plate manufactured as above, a continuous annealing process was performed while varying a dew point condition (DP(I)) at an annealing temperature of 780° C. as in table 2. After the continuous annealing process, a thickness of an Si-based amorphous oxide layer and a thickness of an Fe, Mn, and Cr oxide layer formed on a surface of the cold-rolled steel plate were measured and listed in table 2 below. Also, values of equation (1) to equation (3) were calculated and listed in table 3.

$$1.4 \leq 0.4*Cr + Si \leq 32 \quad \text{Equation (1)}$$

$$1 \leq \exp[0.07*DP(I) + (0.6*Cr + 3*Si)] \leq 100 \quad \text{Equation (2)}$$

$$50*\exp[0.05*DP(I) - (1.2*Cr + 6*Si)] \leq 2.5 \quad \text{Equation (3)}$$

(In equation (1) to equation (3), each element symbol is a value of a content of each element measured by weight %, and in equation (2) and equation (3), DP(I) is a dew point temperature when the continuous annealing is performed).

Figure 4:
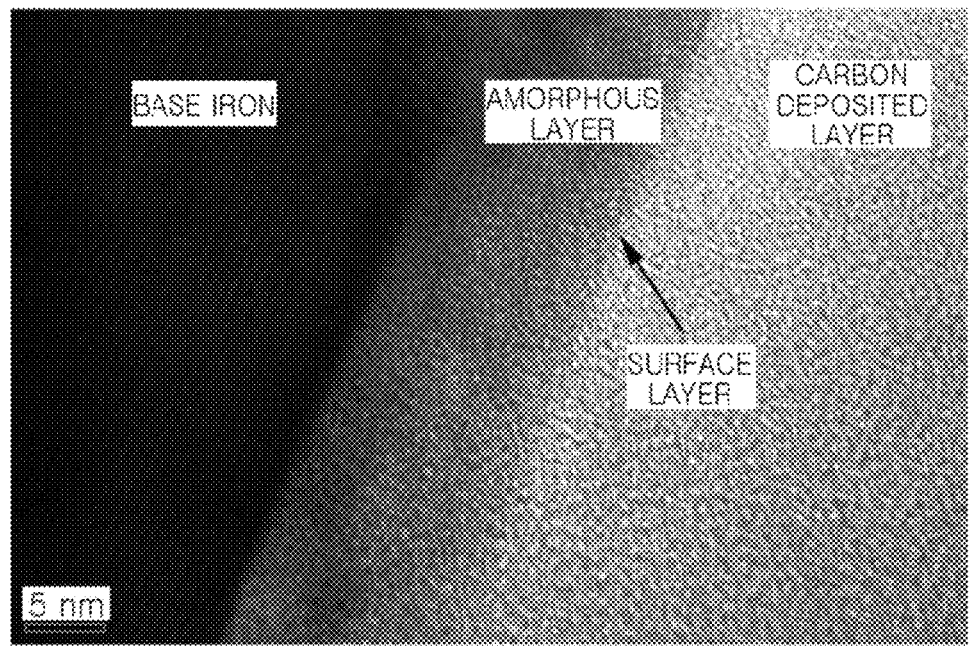
FIG. 4 is an image of a surface layer structure of embodiment A2 of a cold-rolled steel plate.
Figure 5:
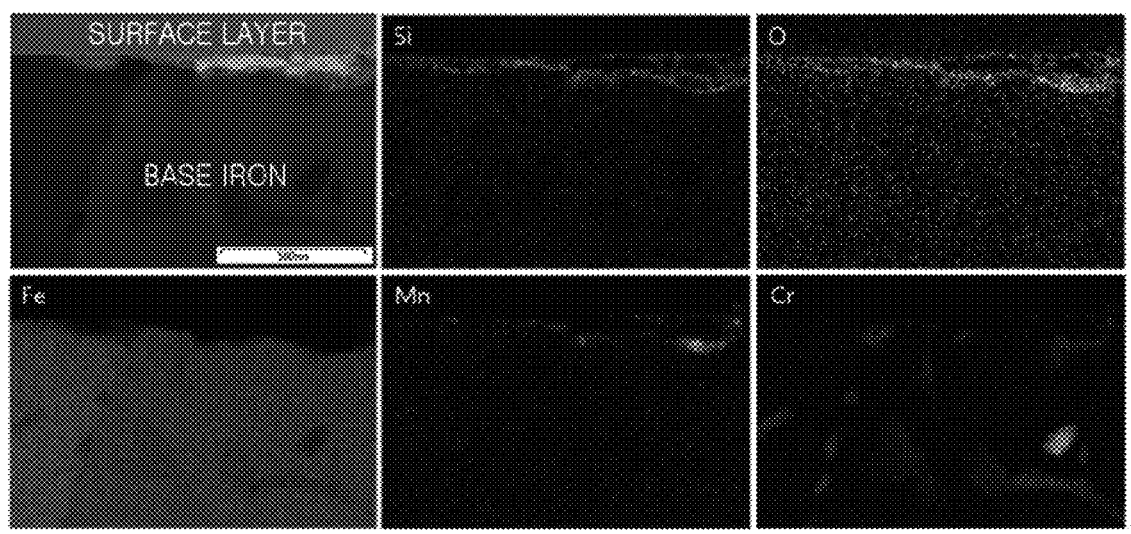
FIG. 5 is images of distributions of surface layer components of embodiment A2 of a cold-rolled steel plate.

A thickness of the Si-based amorphous oxide layer and a thickness of the Fe, Mn, and Cr oxide layer were indicated by result values obtained by averaging thicknesses of three regions measured using a transmission electron microscope (TEM) and an EPMA device. FIGS. 4 and 5 are images showing a representative surface layer structure and a composition distribution of embodiment A2. Embodiments A1 to A4 satisfy equation (2) and equation (3), whereas embodiments A5 and A6 and B1 to B5 do not satisfy equation (2) or equation (3).

Using the cold-rolled steel plate manufactured as above, a hot-forming process was performed, and as heat treatment conditions, a temperature of the heat treatment was controlled to be the dew point temperature (DP(II)) indicated in table 3 below, and after the steel plate was charged into a heating furnace which was heated to be 900° C. in advance, the steel plate was maintained for 6 minutes. Thereafter, the steel plate was air-cooled for 12 seconds, hot-formed in a mold, and rapidly cooled to room temperature at a cooling speed of 10° C./sec or higher, thereby obtaining a hot-formed member. Tensile strength, a surface grade, a thickness of the Si-based amorphous oxide layer, a thickness of the Fe, Mn, and Cr oxide layer, corrosion-resistance, and spot-weldability of the hot-formed member were measured or assessed, and the results are listed in table 3 below. Also, values of equation (4) and equation (5) were calculated and listed in table 3 below.

$$2 \leq \text{equation (2)} * \exp[0.07 * DP(\text{II}) + (0.6 * Cr + 15 * Si)] \leq 2000 \quad \text{Equation (4)}$$

$$\text{equation (3)} + 50 * \exp[0.05 * DP(\text{II}) - (0.4 * Cr + 2 * Si)] \leq 3 \quad \text{Equation (5)}$$

(in equation (4) and equation (5), each element symbol is a value of a content of each element measured by weight %, and DP(II) is a dew point temperature (C) of the heat treatment).

Figure 6:
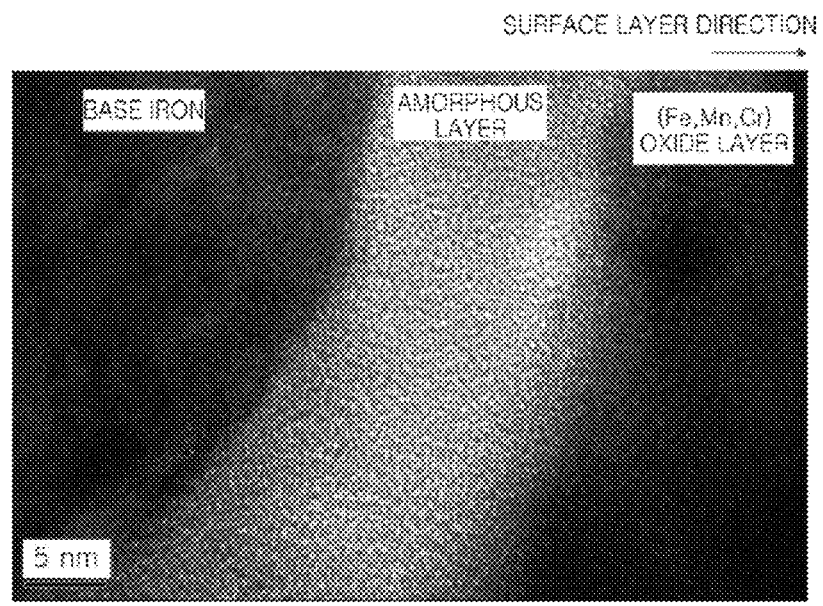
FIG. 6 is an image of a surface layer structure of embodiment A2 of a hot-formed member.
Figure 7:
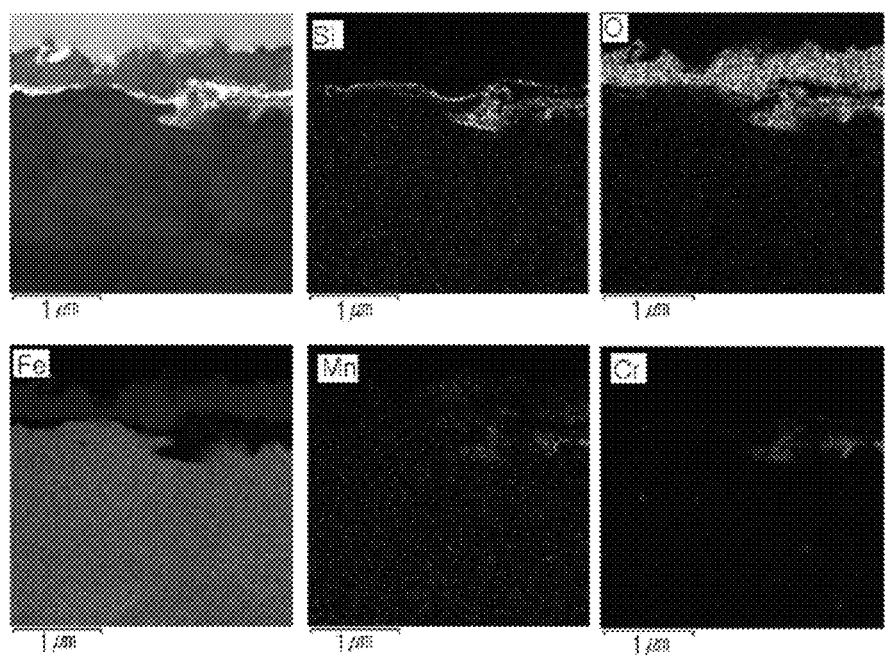
FIG. 7 is images of distributions of surface layer components of embodiment A2 of a hot-formed member.

The tensile strength was measured from an ASTM E8 tensile sample obtained from the hot-formed member, and a thickness of the Si-based amorphous oxide layer and a thickness of the Fe, Mn, and Cr oxide layer were indicated by result values obtained by averaging thicknesses of three regions measured using a transmission electron microscope (TEM) and an EPMA device. A representative surface layer structure and a composition distribution of embodiment A2-1 after hot-forming were indicated in FIGS. 6 and 7.

A surface grade was assessed by observing a surface onto which a shot blasting process was not performed by the naked eye. In other words, an area rate of the case in which a color of a surface looked dark grey as the surface of the member is formed of a thick oxide layer, and an area rate of the case in which a color of a surface appeared yellow or gold as the surface was formed of a thin oxide layer were calculated and assessed as below.

Grade 5: an area rate of a grey surface exceeds 90%
Grade 4: an area rate of a grey surface exceeds 70% and is 90% or less
Grade 3: an area rate of a grey surface exceeds 30% and is 70% or less
Grade 2: an area rate of a grey surface exceeds 10% and is 30% or less
Grade 1: an area rate of a grey surface is 10% or less Corrosion-resistance was assessed by averaging values of corroded depths at three regions with 2 mm of intervals after performing a cyclic corrosion test (CCT) to the hot-formed member sixty three times using salt spray. In the embodiment in which the corroded depth exceeded 1 mm, the embodiment was determined as defect (X), and when the corroded depth was 1 mm or less, the embodiment was determined as good (O).

Spot-weldability was assessed by calculating a spot welding current range using an ISO 18278-2 method. When the current range was 1.0 kA or higher, the embodiment was determined as good, and the current range was less than 1.0 kA, the embodiment was determined as a defect.

TABLE 1

| Steel Type | Chemical Composition (weight %) | | | | | | | | | | | Equation (1) | Note |
| | C | Si | Mn | P | S | Al | Cr | Ti | B | N | Others | | |
|---|---|---|---|---|---|---|---|---|---|---|---|---|---|
| A | 0.20 | 1.18 | 0.21 | 0.010 | 0.002 | 0.03 | 2.00 | 0.03 | 0.0025 | 0.004 | — | 1.98 | Embodiment Steel |
| B | 0.21 | 0.28 | 1.19 | 0.014 | 0.005 | 0.03 | 0.24 | 0.03 | 0.0024 | 0.004 | — | 0.37 | Comparative Steel |
| C | 0.22 | 0.58 | 1.27 | 0.015 | 0.005 | 0.05 | 0.62 | 0.04 | 0.0019 | 0.003 | — | 0.83 | Comparative Steel |

TABLE 2

| Steel type | Classification | Cold-Rolled Steel Plate | | | | | Note |
| | | DP(I) (° C.) | Thickness of Amorphous (nm) | Thickness of Oxide (μm) | Equation (2) | Equation (3) | |
|---|---|---|---|---|---|---|---|
| A | A1 | −50 | 2.7 | 0.0003 | 3.5 | 0.0003 | Embodiment |
|   | A2 | −30 | 16.5 | 0.004 | 14.0 | 0.001 | Embodiment |
|   | A3 | −20 | 25.7 | 0.005 | 28.2 | 0.001 | Embodiment |
|   | A4 | −10 | 65.7 | 0.005 | 56.8 | 0.002 | Embodiment |
|   | A5 | 0 | 120.1 | 0.006 | 114.4 | 0.004 | Comparative Example |
|   | A6 | 10 | 198.7 | 0.008 | 230.4 | 0.006 | Comparative Example |
| B | B1 | −40 | 0.2 | 0.7 | 0.2 | 0.9 | Comparative Example |
|   | B2 | −30 | 0.4 | 1.3 | 0.3 | 1.6 | Comparative Example |
|   | B3 | −20 | 0.5 | 2.4 | 0.7 | 2.6 | Comparative Example |
|   | B4 | −10 | 1.5 | 3.8 | 1.3 | 4.2 | Comparative Example |
|   | B5 | 0 | 1.0 | 9.2 | 2.7 | 7.0 | Comparative Example |
| C | C1 | 30 | 58.0 | 2.8 | 67.5 | 3.3 | Comparative Example |

DP(I): a dew point temperature (° C.) of when a continuous annealing is performed
Amorphous: an Si-based amorphous oxide layer
Oxide: an Fe, Mn, and Cr oxide layer

TABLE 3

| Cold-Rolled Steel Plate | Classification | DP(II) (° C.) | Tensile Strength (MPa) | Surface Grade | Thickness of Amorphous (mm) | Thickness of Oxide (μm) | Equation (4) | Equation (5) | Corrosion-resistance | Range of Spot-Weldability (kA) | Note |
|---|---|---|---|---|---|---|---|---|---|---|---|
| A1 | A1-1 | −40 | 1513 | 1.9 | 3.8 | 0.32 | 4.1 | 0.29 | ○ | 2.6 | Embodiment |
|  | A1-2 | −60 | 1513 | 1.0 | 1.8 | 0.17 | 1.0 | 0.11 | X | 2.8 | Comparative Example |
|  | A1-3 | 20 | 1513 | 3.0 | 251.0 | 5.8 | 273.1 | 5.8 | ○ | 0 | Comparative Example |
| A2 | A2-1 | −30 | 1504 | 1.8 | 27.5 | 0.64 | 33.45 | 0.47 | ○ | 1.8 | Embodiment |
| A3 | A3-1 | −20 | 1527 | 1.8 | 105.6 | 0.78 | 135.64 | 0.78 | ○ | 1.4 | Embodiment |
| A4 | A4-1 | −10 | 1498 | 1.8 | 504.8 | 1.13 | 550.04 | 1.29 | ○ | 1.2 | Embodiment |
| A5 | A5-1 | 0 | 1517 | 1.3 | 2276.8 | 1.84 | 2230.54 | 2.12 | ○ | 0.4 | Comparative Example |
| A6 | A6-1 | 10 | 1508 | 1.3 | 8724.1 | 3.87 | 9045.29 | 3.50 | ○ | 0.2 | Comparative Example |
| B1 | B1-1 | 0 | 1534 | 5.0 | 0.3 | 23.5 | 0.28 | 27.1 | X | 0.2 | Comparative Example |
| B2 | B2-1 | 0 | 1528 | 5.0 | 0.5 | 25.1 | 0.57 | 27.8 | X | 0 | Comparative Example |
| B3 | B3-1 | 0 | 1543 | 5.0 | 1.3 | 26.2 | 1.14 | 28.8 | X | 0 | Comparative Example |
| B4 | B4-1 | 0 | 1527 | 5.0 | 2.5 | 27.1 | 2.29 | 30.5 | ○ | 0 | Comparative Example |
| B5 | B5-1 | 0 | 1515 | 5.0 | 4.3 | 31.5 | 4.62 | 33.3 | ○ | 0 | Comparative Example |
| C1 | C1-1 | 0 | 1575 | 4.0 | 250.0 | 14.5 | 233.7 | 15.5 | ○ | 0 | Comparative Example |

DP(II): a dew point temperature (° C.) of heat treatment
Amorphous: an Si-based amorphous oxide layer
Oxide: an Fe, Mn, and Cr oxide layer A grade of embodiment steel A satisfying a value of equation (1) was less than grade 4 under overall heat treatment conditions in the hot-forming process.

A surface grade of comparative steel B which does not satisfy values of Si, Cr, and equation (1) was grade 5 under heat treatment conditions in the hot-forming process, which indicates that surface properties were deteriorated. A surface grade of embodiment steel C, of which a range of a content of each element satisfies the range of the exemplary embodiment but which does not satisfy a value of equation (1), was grade 4, which indicates that surface properties were deteriorated.

Also, using embodiments A1 to A4, a hot-formed member which may secure both corrosion-resistance and spot-weldability was made.

Comparative examples A5 and A6 which satisfy the alloy composition of the exemplary embodiment but which do not satisfy the conditions of a cold-rolled steel plate of the exemplary embodiment were able to secure corrosion-resistance, but were not able to secure spot-weldability.

Comparative example A1-2 satisfied the conditions of a cold-rolled steel plate of the exemplary embodiment, but a value of equation (4) was less than 2, and accordingly, corrosion-resistance of the hot-formed member was deteriorated. Comparative example A1-3 satisfied the conditions of a cold-rolled steel plate of the exemplary embodiment, but a value of equation (5) exceeded 3, and accordingly, spot-weldability of the hot-formed member was deteriorated.

Embodiment 2

To further check that 1000 MPa or higher tensile strength, and excellent corrosion-resistance and spot-weldability may be secured within the range of the exemplary embodiment, and addition experiments were conducted.

Using a slab having composition as in table 4 and having a thickness of 40 mm, a cold-rolled steel plate and a hot-formed member were manufactured under conditions of a dew point temperature of when a continuous annealing process was performed in table 5 below, a dew point temperature of heat treatment in table 6 below, and other manufacturing conditions as in embodiment 1 above.

A thickness of an Si-based amorphous oxide layer and a thickness of an Fe, Mn, and Cr oxide layer formed on a surface of the cold-rolled steel plate were measured and listed in table 5 below.

Tensile strength, a surface grade, a thickness of the Si-based amorphous oxide layer, a thickness of the Fe, Mn, and Cr oxide layer, corrosion-resistance, and spot-weldability of the hot-formed member were measured or assessed, and listed in table 6 below.

The measuring method and the assessment method were the same as in embodiment 1 above.

TABLE 4

| Steel Type | C | Si | Mn | P | S | Al | Cr | Ti | B | N | Others | Equation (1) | Note |
|---|---|---|---|---|---|---|---|---|---|---|---|---|---|
| D | 0.19 | 1.24 | 3.0 | 0.0070 | 0.0025 | 0.035 | 1.21 | — | — | 0.0040 | — | 1.72 | Embodiment Steel |
| E | 0.21 | 1.21 | 0.06 | 0.0071 | 0.0025 | 0.028 | 2.09 | 0.030 | 0.0025 | 0.0040 | Nb: 0.03 | 2.05 | Embodiment Steel |

TABLE 4-continued

| Steel Type | Chemical Composition (Weight %) | | | | | | | | | | | Equation (1) | Note |
|---|---|---|---|---|---|---|---|---|---|---|---|---|---|
| | C | Si | Mn | P | S | Al | Cr | Ti | B | N | Others | | |
| F | 0.21 | 1.24 | 0.22 | 0.0110 | 0.0025 | 0.034 | 2.03 | 0.033 | 0.0027 | 0.0041 | Ni: 0.15 Cu: 0.51 | 2.05 | Embodiment Steel |
| G | 0.21 | 1.18 | 0.80 | 0.0071 | 0.0025 | 0.024 | 0.79 | 0.030 | 0.0025 | 0.0040 | Mo: 0.15 | 1.50 | Embodiment Steel |
| H | 0.21 | 1.64 | 0.46 | 0.0074 | 0.0024 | 0.035 | 1.15 | 0.030 | 0.0025 | 0.0040 | V: 0.05 | 2.10 | Embodiment Steel |
| I | 0.21 | 1.17 | 0.81 | 0.0073 | 0.0025 | 0.027 | 0.80 | 0.030 | 0.0025 | 0.0040 | Sb: 0.03 | 1.49 | Embodiment Steel |
| J | 0.21 | 1.13 | 0.68 | 0.0086 | 0.0028 | 0.025 | 0.76 | 0.030 | 0.0027 | 0.0038 | Sn: 0.03 | 1.43 | Embodiment Steel |
| K | 0.21 | 1.15 | 0.92 | 0.0113 | 0.0017 | 0.054 | 0.85 | 0.030 | 0.0026 | 0.0024 | W: 0.03 | 1.49 | Embodiment Steel |

TABLE 5

| Steel Type | Cold-Rolled Steel Plate | | | | | Note |
|---|---|---|---|---|---|---|
| | Classification | DP(I) (° C.) | Thickness of Amorphous (nm) | Thickness of Oxide (μm) | Equation (2) | Equation (3) |
| D | D1 | −30 | 13.4 | 0.004 | 10.44 | 0.002 | Embodiment |
| E | E1 | −30 | 14.7 | 0.003 | 16.18 | 0.001 | Embodiment |
| F | F1 | −30 | 18.9 | 0.001 | 17.08 | 0.001 | Embodiment |
| G | G1 | −30 | 8.1 | 0.006 | 6.79 | 0.004 | Embodiment |
| H | H1 | −30 | 27.6 | 0.001 | 33.45 | 0.000 | Embodiment |
| I | I1 | −30 | 4.5 | 0.004 | 6.60 | 0.004 | Embodiment |
| J | J1 | −30 | 4.3 | 0.005 | 5.73 | 0.005 | Embodiment |
| K | K1 | −30 | 4.8 | 0.005 | 6.42 | 0.004 | Embodiment |

DP(I): a dew point temperature (° C.) of when a continuous annealing is performed Amorphous: a thickness of an Si-based amorphous oxide layer Oxide: a thickness of an Fe, Mn, and Cr oxide layer

TABLE 6

| Cold-Rolled Steel Plate | Classification | DP(II) (° C.) | Hot-Formed Member | | | | | | Corrosion-resistance | Range of spot-weldability (kA) | Note |
|---|---|---|---|---|---|---|---|---|---|---|---|
| | | | Tensile Strength (MPa) | Surface Grade | Thickness of Amorphous (nm) | Thickness of Oxide (μm) | Equation (4) | Equation (5) | | | |
| D1 | D1-1 | −10 | 1564 | 2.8 | 52.4 | 1.46 | 68.85 | 1.57 | ○ | 1.8 | Embodiment |
| E1 | E1-1 | −10 | 1506 | 1.8 | 158.2 | 1.85 | 172.95 | 1.17 | ○ | 1.6 | Embodiment |
| F1 | F1-1 | −10 | 1529 | 1.50 | 194.6 | 1.34 | 184.20 | 1.13 | ○ | 1.6 | Embodiment |
| G1 | G1-1 | −10 | 1535 | 3.5 | 45.1 | 2.65 | 31.87 | 2.09 | ○ | 2.2 | Embodiment |
| H1 | H1-1 | −10 | 1487 | 1.5 | 351.2 | 1.30 | 387.61 | 0.72 | ○ | 1.4 | Embodiment |
| I1 | I1-1 | −10 | 1495 | 3.8 | 41.6 | 2.45 | 30.72 | 2.13 | ○ | 2.2 | Embodiment |
| J1 | J1-1 | −10 | 1474 | 3.7 | 38.7 | 2.87 | 24.46 | 2.34 | ○ | 2.4 | Embodiment |
| K1 | K1-1 | −10 | 1513 | 3.4 | 28.1 | 2.49 | 29.81 | 2.17 | ○ | 2.4 | Embodiment |

DP(II): a dew point temperature (° C.) of heat treatment

Amorphous: a thickness of an Si-based amorphous oxide layer

Oxide: a thickness of an Fe, Mn, and Cr oxide layer

As indicated in table 6, embodiments D1-1 to K1-1 satisfied the alloy composition and the manufacturing conditions of the exemplary embodiment, and accordingly, excellent corrosion-resistance and spot-weldability were secured.

While exemplary embodiments have been shown and described above, the scope of the present disclosure is not limited thereto, and it will be apparent to those skilled in the art that modifications and variations could be made without departing from the scope of the present invention as defined by the appended claims.

The invention claimed is:

1. A hot-formed product, comprising:
 a base steel;
 a first oxide layer comprising Si on the base steel; and
 a second oxide layer comprising Fe on the first oxide layer;
 wherein a first thickness of the first oxide layer is smaller than a first thickness of the second oxide layer.

2. The hot-formed product of claim 1,
 wherein the first oxide layer comprises Mn.

3. The hot-formed product of claim 1,
 wherein the first oxide layer comprises Cr.

4. The hot-formed product of claim 1,
 wherein the first oxide layer comprises Fe.

5. The hot-formed product of claim 1,
 wherein the second oxide layer comprises Mn.

6. The hot-formed product of claim 1,
 wherein the second oxide layer comprises Cr.

7. The hot-formed product of claim 1,
 wherein the second oxide layer comprises Si.

8. The hot-formed product of claim 1,
 wherein the first thickness of the first oxide layer is smaller than a second thickness of the first oxide layer.

9. The hot-formed product of claim 1,
 wherein the first thickness of the second oxide layer is smaller than a second thickness of the second oxide layer.

10. The hot-formed product of claim 1,
 wherein an amount of Cr of the first oxide layer is greater than an amount of Cr of the second oxide layer.

11. A hot-formed product, comprising:
 a base steel;
 a first oxide layer comprising Si on the base steel; and
 a second oxide layer comprising Fe on the first oxide layer;
 wherein the first oxide layer is continuously or discontinuously formed on the base steel.

12. The hot-formed product of claim 11,
 wherein the first oxide layer comprises Mn.

13. The hot-formed product of claim 11,
 wherein the first oxide layer comprises Cr.

14. The hot-formed product of claim 11,
 wherein the first oxide layer comprises Fe.

15. The hot-formed product of claim 11,
 wherein the second oxide layer comprises Mn.

16. The hot-formed product of claim 11,
 wherein the second oxide layer comprises Cr.

17. The hot-formed product of claim 11,
 wherein the second oxide layer comprises Si.

18. The hot-formed product of claim 11,
 wherein a first thickness of the first oxide layer is smaller than a second thickness of the first oxide region.

19. The hot-formed product of claim 11,
 wherein a first thickness of the second oxide layer is smaller than a second thickness of the second oxide region.

20. The hot-formed product of claim 11,
 wherein an amount of Cr of the first oxide layer is greater than an amount of Cr of the second oxide region.

* * * * *